(12) United States Patent
Scott et al.

(10) Patent No.: US 12,067,138 B2
(45) Date of Patent: Aug. 20, 2024

(54) SYSTEMS AND METHODS FOR LINKING A SCREEN CAPTURE TO A USER SUPPORT SESSION

(71) Applicant: Capital One Services, LLC, McLean, VA (US)

(72) Inventors: Thomas H. Scott, Richmond, VA (US); Jude Pierre Anasta, Hudson, NY (US); Fayaz Khan, Souderton, PA (US); Patrick Blinkhorn, Silver Spring, MD (US); Mary Sweeney, Wilmington, DE (US); Tejen Shrestha, Arlington, VA (US); Joseph Amburgey, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 390 days.

(21) Appl. No.: 17/583,115

(22) Filed: Jan. 24, 2022

(65) Prior Publication Data

US 2023/0237180 A1    Jul. 27, 2023

(51) Int. Cl.
*G06F 21/62* (2013.01)
*G06F 9/451* (2018.01)
*G06F 9/54* (2006.01)
*G06N 20/00* (2019.01)

(52) U.S. Cl.
CPC .......... *G06F 21/6218* (2013.01); *G06F 9/451* (2018.02); *G06F 9/543* (2013.01); *G06N 20/00* (2019.01)

(58) Field of Classification Search
CPC ...... G06F 21/6218; G06F 9/451; G06F 9/543; G06F 21/6245; G06N 20/00; G06N 3/008
See application file for complete search history.

(56) References Cited

U.S. PATENT DOCUMENTS

| 10,038,787 | B2 | 7/2018 | Tamblyn et al. |
| 10,366,168 | B2 | 7/2019 | Wu |
| 2014/0279050 | A1 | 9/2014 | Makar et al. |
| 2017/0185596 | A1 | 6/2017 | Spirer |

*Primary Examiner* — Izunna Okeke
(74) *Attorney, Agent, or Firm* — TROUTMAN PEPPER HAMILTON SANDERS LLP; Christopher J. Forstner; John A. Morrissett

(57) ABSTRACT

Systems and methods for linking a screen capture to a user support session are disclosed. The system may receive a screen capture initiation request from a user device. The system may capture a first data object indicative of a first graphical user interface associated with the user device. The system may provide, to the user device, the first graphical user interface for a predetermined period of time. The system may track, by the one or more processors, one or more inputs from the user device that indicate the presence of one or more articles of sensitive information within the graphical user interface. The system may mask the one or more articles of sensitive information within the graphical user interface, generate a second data object indicative of the graphical user interface having the masked articles of sensitive information, and store the second data object in a data repository.

19 Claims, 6 Drawing Sheets

SYSTEMS AND METHODS FOR LINKING A SCREEN CAPTURE TO A USER SUPPORT SESSION

FIELD

The disclosed technology relates to systems and methods for screen capture, and more particularly systems and methods for identifying sensitive articles of information within a screen capture of a graphical user interface and masking the sensitive articles of information before storing the screen capture on a data repository.

BACKGROUND

Businesses often rely on automated systems to troubleshoot issues customers have with their products or services. For example, artificial intelligence (AI) chatbots are utilized to provide a convenient method of receiving immediate support for technical customer issues. However, often the customer needs to provide additional contextual information to the chatbot in order for the issue to be resolved. For example, a customer may wish to upload one or more screenshots associated with the issue the customer is facing with the business's product or service. In addition, some customer problems cannot be resolved by an AI chatbot and must be transferred to a human customer service representative. Indeed, current customer service solutions do not provide a seamless method of providing the additional contextual information (e.g., screenshot) to the human customer service representative when the AI chatbot is unable to resolve the customer's issue. Importantly, screenshots provided by the customer often includes sensitive information, which poses a security risk to both the customer and the business potentially collecting and storing the customer's sensitive information.

Accordingly, there is a need for more robust AI chatbot integration systems capable of providing the customer a seamless method of capturing a screenshot, masking articles of sensitive information within the screenshot, and providing the masked screenshot to the AI chatbot system, a human customer service representative, or both. Embodiments of the present disclosure are directed to this and other considerations.

SUMMARY

Disclosed herein are systems and methods for linking a screen capture to a user support session. The system may include one or more processors and memory in communication with the one or more processors and storing instructions that, when executed by the one or more processors, cause the system to perform one or more steps of a method. The system may receive, by an API implemented by the one or more processors, a screen capture initiation request from a user device. The system may capture, by the API, a first data object indicative of a first graphical user interface associated with the user device. The system may provide, to the user device, the first graphical user interface for a predetermined period of time. The first graphical user interface may include a request for a user of the user device to identify one or more articles of sensitive information within the first graphical user interface. The system may track, by the one or more processors via the API, one or more inputs received from the user device that indicate a position of the one or more first articles of sensitive information within the first graphical user interface over the predetermined period of time. The system may mask, by the API, the one or more articles of sensitive information within the first graphical user interface. The system may automatically generate a second data object indicative of a second graphical user interface that includes the masked one or more first articles of sensitive information. The system may store, by the API, the second data object in a data repository.

Consistent with the disclosed embodiments, a system for linking a screen capture to a user support session is disclosed. The system may include one or more processors and memory in communication with the one or more processors and storing instructions that, when executed by the one or more processors, cause the system to perform one or more steps of a method. The system may receive, from a user device, a support request comprising a user identifier. The system may initiate a chatbot support session with the user device. The system may transmit, by an API implemented by the one or more processors, a screen capture initiation request to the user device. The system may receive, by the API, an approval of the screen capture initiation request. The system may capture, by the API, a first data object indicative of a first graphical user interface associated with the user device. The system may identify, by the API, one or more first data entries within the first data object indicative of one or more first articles of sensitive information displayed by the first graphical user interface. The system may mask, by the API, the one or more first articles of sensitive information within the first graphical user interface by modifying the one or more first data entries. The system may provide, to the user device, a modified graphical user interface for a predetermined period of time. The modified graphical user interface may include the masked one or more articles of sensitive information and a request for a user of the user device to identify one more second articles of sensitive information within the modified graphical user interface. The system may track, by the one or more processors via the API, the one or more inputs received from the user device that indicate a position of the one or more second articles of sensitive information within the modified graphical user interface over the predetermined period of time. The system may mask, by the API, the one or more second articles of sensitive information within the modified graphical user interface. The system may automatically generate a second data object indicative of a second graphical user interface. The second graphical user interface may include the masked one or more first articles of sensitive information and masked one or more second articles of sensitive information. The system may store, by the API, the second data object and the user identifier associated with the support request in a data repository. The system may provide the second data object and the user identifier to an agent terminal. The system may transfer the chatbot support session to the agent terminal.

Consistent with the disclosed embodiments, a computer-implemented method for linking a screen capture to a user support session is disclosed. The method may include receiving, from a user device, a support request that includes a user identifier. The method may include initiating a chatbot support session with the user device. The method may include, transmitting, by an API implemented by one or more processors, a screen capture initiation request to the user device. The method may include receiving, by the API, an approval of the screen capture initiation request. The method may include capturing, by the API, a first data object indicative of a first graphical user interface associated with the user device. The method may include identifying, by the API, one or more first data entries within the first data object indicative of one or more first articles of sensitive information displayed by the first graphical user interface. The method may include masking, by the API, the one or more first articles of sensitive information within the first graphical user interface by modifying the one or more first data entries. The method may include providing, to the user device, a modified graphical user interface for a predetermined period of time. The modified graphical user interface can include the masked one or more first articles of sensitive information and a request for a user of the user device to identify one or more second articles of sensitive information within the modified graphical user interface. The method may include tracking, by the one or more processors and via the API, one or more inputs received from the user device indicating a position of the one or more second articles of sensitive information within the modified graphical user interface over the predetermined period of time. The method may include masking, by the API, the one or more second articles of sensitive information within the modified graphical user interface. The method may include automatically generating a second data object indicative of a second graphical user interface. The second graphical user interface may include the masked one or more first articles of sensitive information and masked one or more second articles of sensitive information. The method may include storing, by the API, the second data object in a data repository. The method may include providing the second data object to an agent terminal, and transferring the chatbot support session to the agent terminal.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

According to certain example implementations of the disclosed technology, systems and methods are disclosed herein for linking a screen capture to a user support session and automatically masking one or more articles of sensitive information present on the screen capture before providing the screen capture to an agent. More particularly, the disclosed technology relates to identifying articles of sensitive information from the screen capture. This involves aggregating and normalizing large quantities of data, recognizing connections between the data, and using predictive classification to identify articles of sensitive information within a screen capture. The systems and methods described herein are necessarily rooted in computer and technology as they relate to dynamically determining articles of sensitive information. In some instances, the system utilizes machine learning models to aggregate the data, reduce and filter the data, and masked screen capture images based on the data. Machine learning models are a unique computer technology that involves training the models to complete tasks, such as labeling, categorizing, or determining which risks are important. Importantly, examples of the present disclosure improve the speed with which computers can link screen captures to a user support session and automatically mask articles of sensitive information within the screen captures to be conducted in near real-time, unlike current methods which only use lagging indicators. This allows for sensitive information to be proactively removed from screen captures before they are stored by an organization, removing the possibility of an unauthorized user or third party entity gaining access to the sensitive information.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
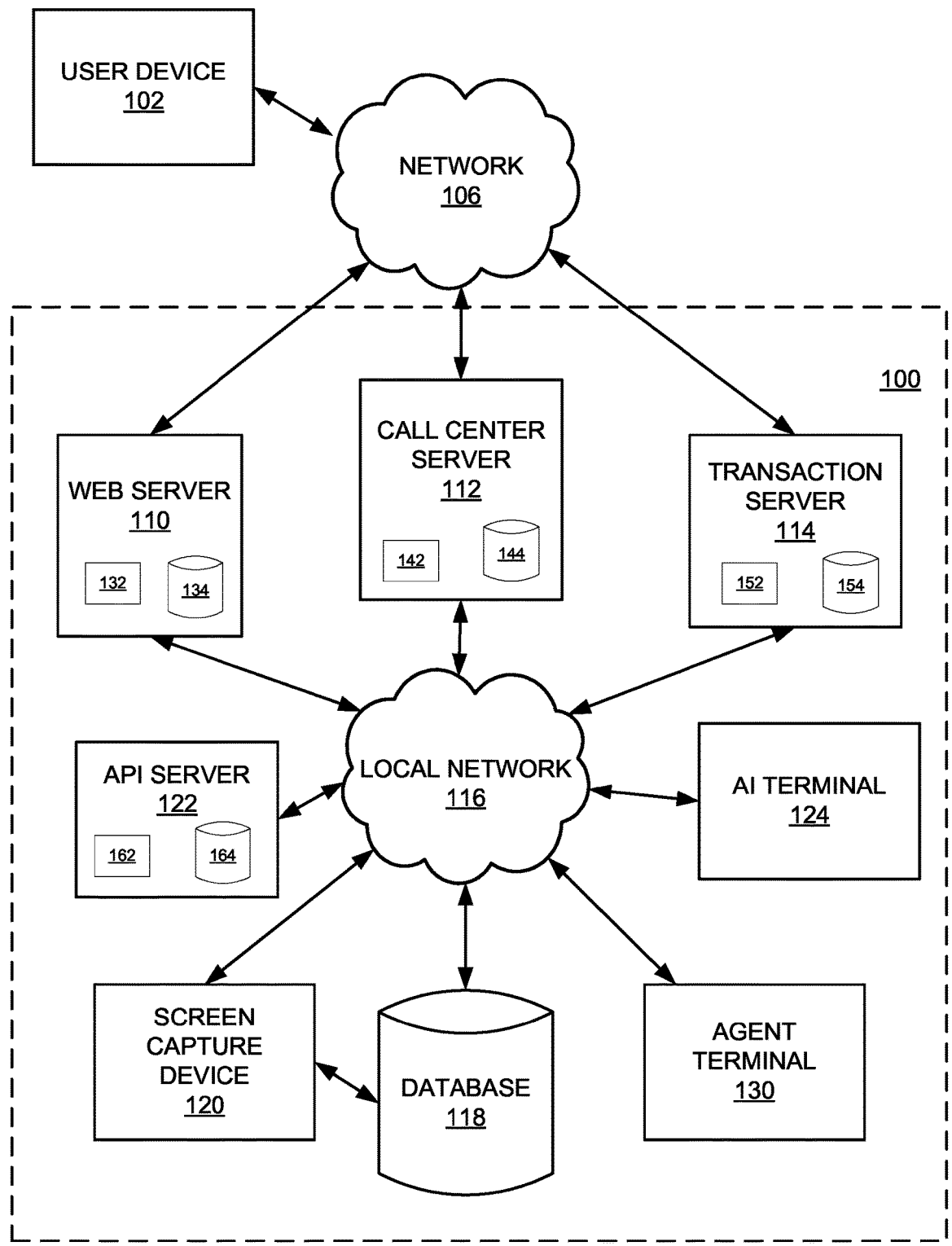
FIG. 1 is a block diagram of an example system 100 that may be used to link a screen capture to a user support session, according to an example implementation of the disclosed technology.

FIG. 1 is a block diagram of an example system 100 that may be used to link a screen capture to a user support session and mask one or more articles of sensitive information within the screen capture. The components and arrangements shown in FIG. 1 are not intended to limit the disclosed embodiments as the components used to implement the disclosed processes and features may vary. As shown, system 100 may interact with a user device 102 via a network 106. In certain example implementations, system 100 may include a web server 110, call center server 112, a transaction server 114, a local network 116, a screen capture device 120, a database 118, an API server 122, an artificial intelligence (AI) terminal 124, and an agent terminal 130.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of the system 100. In some embodiments, the user device 102 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from an entity associated with the system 100. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetoothm™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

The system 100 may be associated with and optionally controlled by an entity such as a business, corporation, individual, partnership, or any other entity that provides one or more of goods, services, and consultations to individuals such as users or customers. The system 100 may include one or more servers and computer systems for performing one or more functions associated with products and/or services that the organization provides. Such servers and computer systems may include, for example, the web server 110, the call center server 112, and/or the transaction server 114, as well as any other computer systems necessary to accomplish tasks associated with the organization or the needs of users (which may be customers of the entity associated with the organization). The web server 110 may include a computer system configured to generate and provide one or more websites accessible to users, as well as any other individuals involved in an organization's normal operations. The web server 110, for example, may include a computer system configured to receive communications from the user device 102 via for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the network 106) by one or more devices (e.g., the screen capture device 120, the AI terminal 124, and/or the agent terminal 130) of the system 100. In some embodiments, one or more processors 132 may be used to implement an automated natural language dialogue system that may interact with a user via different types of communication channels such as a website, mobile application, instant messaging application, SMS message, email, phone, or any other type of spoken or written electronic communication. When receiving an incoming message from, for example, the user device 102, the web server 110 may be configured to determine the type of communication channel the user device 102 used to generate the incoming message.

The call center server 112 may include a computer system configured to receive, process, and route telephone calls and other electronic communications between a user operating a user device 102 and the screen capture device 120. The call center server 112 may have one or more processors 142 and one or more call center databases 144, which may be any suitable repository of call center data. Information stored in the call center server 112 may be accessed (e.g., retrieved, updated, and added to) via the local network 116 (and/or network 106) by one or more devices of the system 100. In some embodiments, the call center server processor 142 may be used to implement an interactive voice response (IVR) system that interacts with the user over the phone.

The transaction server 114 may include a computer system configured to process one or more transactions involving an account associated with users or customers, or a request received from users or customers. In some embodiments, transactions can include, for example, a product/service purchase, product/service return, financial transfer, financial deposit, financial withdrawal, financial credit, financial debit, dispute request, warranty coverage request, shipping information, delivery information, and any other type of transaction associated with the products and/or services that an entity associated with system 100 provides to individuals such as customers. The transaction server 114 may have one or more processors 152 and one or more transaction server databases 154, which may be any suitable repository of transaction data. Information stored in transaction server 114 may be accessed (e.g., retrieved, updated, and added to) via the local network 116 (and/or network 106) by one or more devices of the system 100.

In some embodiments, the transaction server 114 tracks and stores event data regarding interactions between a third-party with the system 100 on behalf of the individual users or customers. For example, the transaction server 114 may track third-party interactions such as purchase requests, refund requests, shipping status, shipping charges, warranty claims, account withdrawals and deposits, and any other type of interaction that the user or customer may conduct with the third party.

The local network 116 may include any type of computer networking arrangement used to exchange data in a localized area, such as WiFi, Bluetooth™ Ethernet, and other suitable network connections that enable components of the system 100 to interact with one another and to connect to the network 106 for interacting with components in the system 100 environment. In some embodiments, the local network 116 may include an interface for communicating with or linking to the network 106. In other embodiments, certain components of the system 100 may communicate via the network 106, without a separate local network 116.

In accordance with certain example implementations of the disclosed technology, the screen capture device 120, which is described more fully below with reference to FIG. 2, may include one or more computer systems configured to compile data from a plurality of sources, such as the web server 110, the call center server 112, the transaction server 114, and/or the database 118. The screen capture device 120 may correlate compiled data, analyze the compiled data, arrange the compiled data, generate derived data based on the compiled data, and store the compiled and derived data in a database such as the database 118. According to some embodiments, the database 118 may be a database associated with an organization and/or a related entity that stores a variety of information relating to users, customers, transactions, and business operations. The database 118 may also serve as a back-up storage device and may contain data and information that is also stored on, for example, databases 134, 144, 154, 164, (and 280, as will be discussed with reference to FIG. 2). The database 118 may be accessed by the screen capture device 120 and may be used to store records of every interaction, communication, and/or transaction a particular user or customer has had with the organization 108 and/or its related entity in the past to enable the creation of an ever-evolving customer context that may enable the screen capture device 120, to identify a data object corresponding to a graphical user interface displayed on a user device, capture a screenshot corresponding to the data object, mask one or more articles of sensitive information found within the captured screenshot, store the screenshot on a database (e.g., database 118 and/or database 280), and provide the masked screenshot to one of an agent terminal (e.g., agent terminal 130) or an AI terminal (e.g., AI terminal 124), thereby linking the masked screenshot to a user support session initiated between a user (e.g., via user device 102) and an AI or human customer service representative (e.g., via one of AI terminal 124 or agent terminal 130).

In certain example implementations, the API server 122 may include one or more computer systems configured to execute one or more application program interfaces (APIs) that provide various functionalities related to the operations of the system 100. In some embodiments, the API server 122 may include API adapters that enable the API server 122 to interface with and utilize enterprise APIs maintained by an organization and/or an associated entity that may be housed on other systems or devices. In some embodiments, APIs can provide functions that include, for example, retrieving user account information, modifying user account information, executing a transaction related to an account, scheduling a payment, authenticating a user, updating a user account to opt-in or opt-out of notifications, and any other such function related to management of user profiles and accounts. The API server 122 may include one or more processors 162 and one or more API databases 164, which may be any suitable repository of API data. Information stored in the API server 122 may be accessed (e.g., retrieved, updated, and added to) via the local network 116 (and/or network 106) by one or more devices (e.g., screen capture device 120) of system 100. In some embodiments, the API processor 162 may be used to implement one or more APIs that can access, modify, and retrieve user account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

In accordance with certain example implementations of the disclosed technology, the AI terminal 124 may include a computer system configured to receive and process incoming messages and determine a meaning of the incoming message. In some embodiments, the AI terminal 124 may be configured to generate a natural language phrase in response to an incoming message (e.g., a message received from a user via user device 102). Accordingly, in some embodiments, the AI terminal 124 may be configured to output an event that contains data representing natural language. According to some embodiments, in response to receiving a message (e.g., from user device 102), the AI terminal 124 may determine that a user associated with the user device may require technical support and the AI terminal 124 may initiate a user support session. As part of the user support session, the AI terminal 124 may provide to the user a request for a screen capture. Upon receiving an affirmative response to the request for a screen capture, the AI terminal 124 may instruct a secondary device (e.g., the screen capture device 120) to capture a screenshot associated with a graphical user interface displayed on the user device (e.g., user device 102).

Agent terminal 130 may include a computer system configured to receive customer support requests from a user (e.g., via user device 102). In some embodiments, the AI terminal 124 may determine that the user requesting a support session may require support from a human customer service representative, and accordingly transfer the user support session to the agent terminal 130. The agent terminal 130 may be configured to provide a customer support representative associated with system 100 to interact with a user requesting a user support session from system 100.

Although described in the above embodiments as being performed by the web server 110, the call center server 112, the transaction server 114, the dialogue learning module 120, the database 118, the API server 122, the AI terminal 124, and the agent terminal 130, some or all of those functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
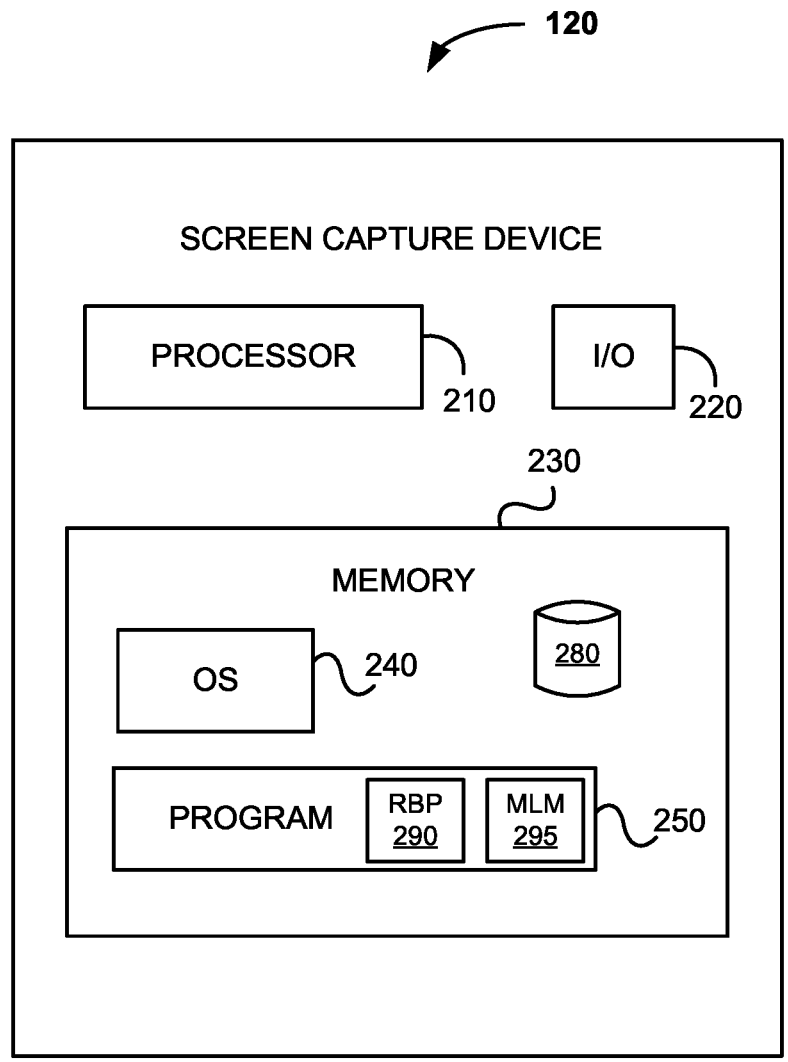
FIG. 2 is a block diagram of an example screen capture device 120, as shown in FIG. 1, with additional details.

FIG. 2 is a block diagram (with additional details) of the example screen capture device 120, as also depicted in FIG. 1. According to some embodiments, the user device 102, the web server 110, the call center server 112, the transaction server 114, the API server 122, the AI terminal 124, and the agent terminal 130, as depicted in FIG. 1, may have a similar structure and components that are similar to those described with respect to screen capture device 120 shown in FIG. 2. As shown, the screen capture device 120 may include a processor 210, an input/output ("I/O") device 220, a memory 230 containing an operating system ("OS") 240 and a program 250. In certain example implementations, the screen capture device 120 may be a single server or may be configured as a distributed computer system including multiple servers or computers that interoperate to perform one or more of the processes and functionalities associated with the disclosed embodiments. In some embodiments, the screen capture device 120 may further include a peripheral interface, a transceiver, a mobile network interface in communication with the processor 210, a bus configured to facilitate communication between the various components of the screen capture device 120, and a power source configured to power one or more components of the screen capture device 120. According to some embodiments, screen capture device 120 can be implemented as an application programming interface that communicates with other devices within the system 100, such as user device 102. In some embodiments, screen capture device can be a client-side application that is installed and operates on user device 102.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the screen capture device 120 may include one or more storage devices configured to store information used by the processor 210 (or other components) to perform certain functions related to the disclosed embodiments. In one example, the screen capture device 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the screen capture device 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the screen capture device 120 may include the memory 230 that may include one or more programs 250 to perform one or more functions of the disclosed embodiments. For example, in some embodiments, the screen capture device 120 may additionally implement one or more of a rule-based platform and/or a machine learning model to identify and mask sensitive articles of information within screenshots captured by the screen capture device 120, via a program 250.

In certain example implementations, the program 250 that may include a rule-based platform 290 for identifying one or more articles of sensitive information within a graphical user interface on a user device (e.g., user device 102) in accordance with a set of predefined rules. In some embodiments, the screen capture device 120 may include a trained machine learning model 295 for identifying one or more articles of sensitive information within the graphical user interface of the user device, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the rule-based platform 290 or the trained machine learning model 295), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a user information database 280 for storing related data to enable the screen capture device 120 to perform one or more of the processes and functionalities associated with the disclosed embodiments.

The user information database 280 may include stored data relating to a user or customer profile and user or customer accounts, such as for example, user identification, name, age, sex, birthday, address, account status, preferences, preferred language, greeting name, preferred communication channel, account numbers, order history, delivery history, authorized users associated with one or more accounts, account balances, account payment history, and other such typical account information. The user information database 280 may further include stored data relating to previous interactions between the organization (or its related entity) and a user. For example, the user information database 280 may store user interaction data that includes records of previous interactions with a user via a website, SMS, a chat program, a mobile application, an IVR system, or notations taken after speaking with a customer service agent. The user information database 280 may also include information about business transactions between the organization (or its related entity) and a user or customer that may be obtained from, for example, the transaction server 114. According to some embodiments, the user information database 280 may be used by the screen capture device 120 to provide training data for identifying articles of sensitive information based on the stored data related to previous interactions between the organization and a respective user.

The user information database 280 may also include user feedback data such as an indication of an article of sensitive information that was initially not identified by the system (e.g., via screen capture device 120), as well as data entries that were identified as articles of sensitive information which a user does not consider sensitive. According to some embodiments, the functions provided by the user information database may also be provided by a database that is external to the screen capture device 120, such as the database 118 as shown in FIG. 1.

The screen capture device 120 may also be communicatively connected to one or more memory devices (e.g., databases) locally or through a network. The remote memory devices may be configured to store information and may be accessed and/or managed by the screen capture device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The screen capture device 120 may also include one or more I/O devices 220 that may comprise one or more interfaces for receiving signals or input from devices and providing signals or output to one or more devices that allow data to be received and/or transmitted by the screen capture device 120. For example, the screen capture device 120 may include interface components, which may provide interfaces to one or more input devices, such as one or more keyboards, mouse devices, touch screens, track pads, trackballs, scroll wheels, digital cameras, microphones, sensors, and the like, that enable the screen capture device 120 to receive data from one or more users (such as, for example, via the user device 102).

In example embodiments of the disclosed technology, the screen capture device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the screen capture device 120 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the screen capture device 120 may include a greater or lesser number of components than those illustrated.

Figure 3:
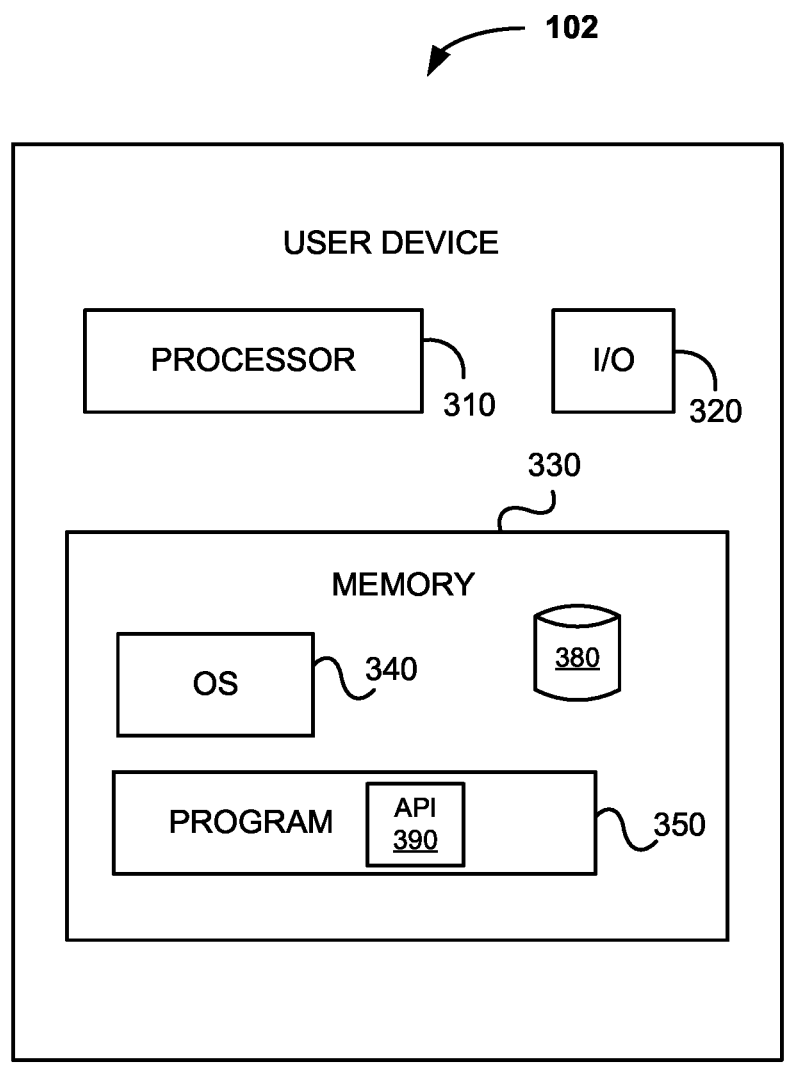
FIG. 3 is a block diagram of an example user device 102, as shown in FIG. 1, with additional details.

FIG. 3 is a block diagram of an example user device 102, as shown in FIG. 1, with additional details. User device 102 has many similar elements as discussed with respect to screen capture device 120 of FIG. 2, and accordingly, a full discussion of elements 310, 320, 330, 340, 350, and 380 are omitted here for brevity. As shown, user device 102 may include an API 390 installed as a program 350 on user device 102. API 390 may be configured to interact screen capture device 120 and may be configured to capture data objects indicative of graphical user interfaces associated with user device 102. Data objects can be captured in various formats, including but not limited to a "document object model (DOM)," or an image object (e.g., JPEG) that is subsequently converted into data strings using techniques such as optical character recognition.

Figure 4:
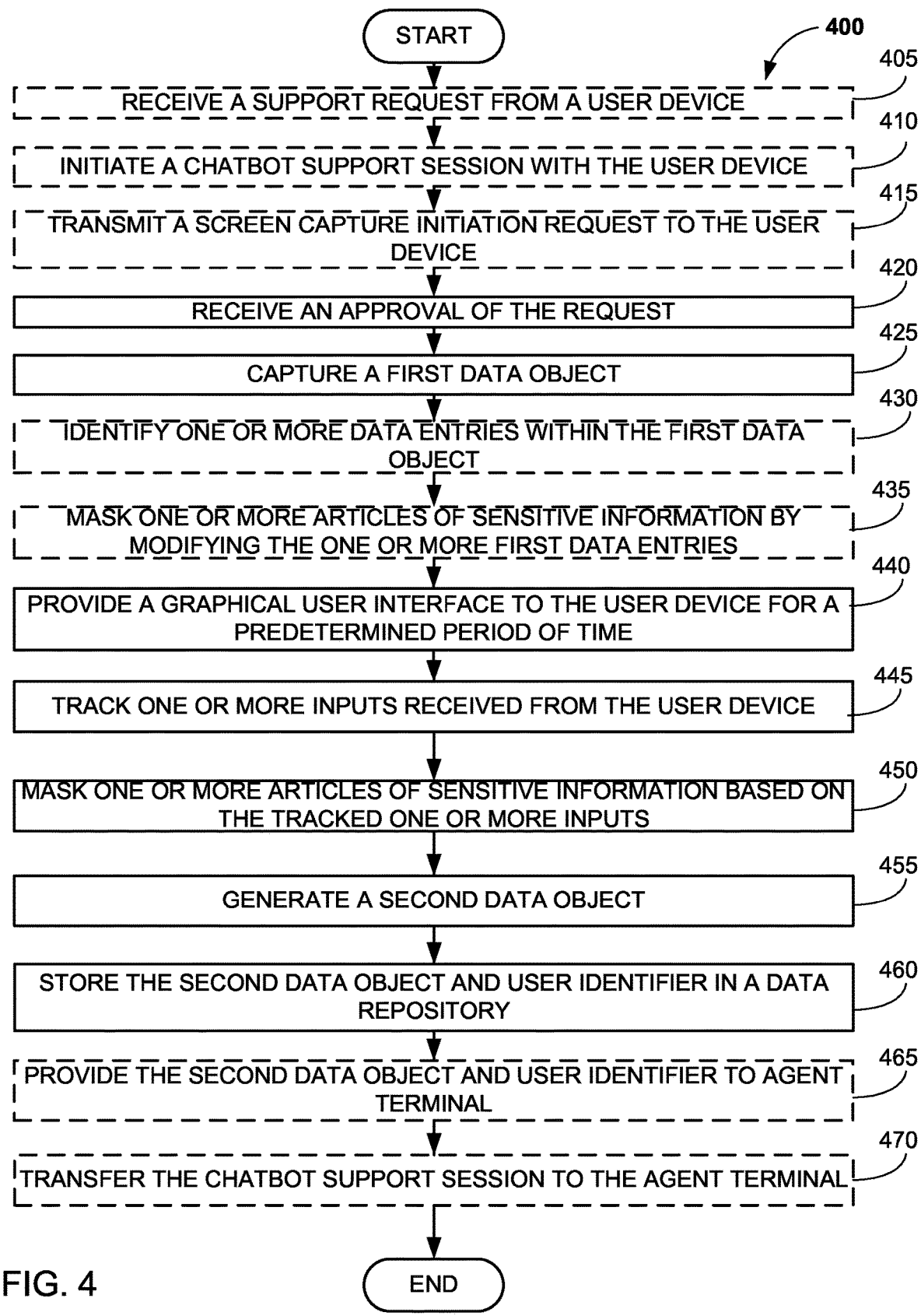
FIG. 4 is a flow diagram 400 illustrating examples of methods for linking a screen capture to a user support session, according to an example implementation of the disclosed technology.

FIG. 4 is a flow diagram 400 illustrating examples of methods for linking a screen capture to a user support session, according to an example implementation of the disclosed technology. In optional block 405, the system may receive a support request from a user device. For example a user (e.g., using user device 102) may initiate a support session with one or more components of system 100. For example, the user device may initiate a support request by clicking on a hyperlink or button on a web page provided to the user device by a web server (e.g., web server 110) associated with system 100. In other embodiments, the user may initiate the support request over a phone call, for example, by uttering a phrase indicating that the user would like to receive customer support which may be received by a call center server (e.g., call center server 112). In other embodiments, the user may initiate a support request by indicating a transaction which includes an error or anomaly that the user wishes to reconcile by selecting the transaction in question out of a provided to the user device by a transaction server (e.g., transaction server 114). As shown in optional block 405, the system may receive a support request from a user device (e.g., user device 102). The support request may be received by one of a variety of different components of system 100. For example, user device 102 may initiate a support request by clicking on a hyperlink or button on a website administered by system 100. In response to the user device interacting with a component of the webpage, web server 110 may receive the support request from the user device. In another embodiment, the user device may initiate the support request by entering a keypress or speaking a word or phrase over an IVR system implemented by a component of system 100 (e.g., call center server 112). In another embodiment, the user device may initiate the support request by navigating to a transaction website or application operated by the system and clicking on a button or hyperlink that corresponds to requesting support for a particular transaction. In response, transaction server 112 may receive the support request from the user device. In some embodiments, the support request may be received through an API communicating with user device 102 and implemented by API server 122. Accordingly, API server 122 may receive a support request from user device 102 when a user operating user device 102 clicks on a link or button associated with initiating a user support request. In response, the API server 122 may generate a call to one or more components of system 100 (e.g., screen capture device 120, AI terminal 124, and/or agent terminal 130).

In optional block 410, the system (e.g., AI terminal 124) may initiate a chatbot support session with the user device in response to the support request. For example, the AI terminal 124 may begin a question-response dialogue pattern in which the AI terminal 124 may attempt to identify an issue that the user wishes to receive help with and attempt to resolve the issue. AI terminal 124 may interact with the user device 102 in a variety of different ways, including generating voice questions and responses over an IVR system or generating text responses over a communication channel such as a website, a chat application, and/or email.

In optional block 415, the system (e.g., AI terminal 124) may determine an issue associated with the user support request and determine that additional contextual information is required in order to resolve the user's issue. Accordingly, AI terminal 124 may instruct screen capture device 120 to transmit a screen capture initiation request to the user device (e.g., user device 102). The screen capture initiation request may be received by user device 102 in a variety of different communication channels. For example, if the user support request was initiated over a voice connection, the screen capture initiation request may be received by the user device 102 over the same voice channel. In some embodiments, the screen capture initiation request may be received over a text channel such as email, SMS, web chat, etc. In yet other embodiments, API server 122 may provide an API call to the user device 102 through an application installed on user device 102 to provide a screen capture initiation request. In block 420, the system (e.g., screen capture device 120) may receive an approval of the screen capture initiation request from user device 102.

In block 425, the system (e.g., screen capture device 120) may capture a first data object. The first data object may be indicative of and correlated to a graphical user interface associated with the user device (e.g., user device 102). According to some embodiments, the first data object may be a JSON object. The data object may include instructions that when executed by a corresponding computing device, may be able to recreate the graphical user interface associated with the user device. For example, a user of the user device may wish to receive support regarding an unrecognizable transaction associated with a financial account implemented by the system. Accordingly, during the support request, AI terminal 124 may determine that the support request is associated with the unrecognizable transaction, and request a screenshot (e.g., by instructing screen capture device 120) from the user device 102 in order to aid in resolving the user issue. According to some embodiments, the system may receive metadata associated with the screen capture in addition to the data object captured by the system. For example, the system may receive metadata including a user identifier (e.g., a username), a user session identifier (e.g., an identifier corresponding to the user's support request), and a timestamp associated with the screen capture initiation request.

In optional block 430, the system (e.g., screen capture device 120) may identify one or more data entries within the first data object. For example, the system may parse the code associated with the first data object to identify data entries within the first data object, such as strings of text associated with information inputted into a webpage by the user device 102. According to some embodiments, the data entries within the first data object may be indicative of one or more first articles of sensitive information displayed in the graphical user interface on user device 102. According to some embodiments, the screen capture device 120 may identify the one or more data entries associated with sensitive information according to one or more heuristics (e.g., implemented on screen capture device 120 as rule-based platform 290). The system may be configured to identify data entry fields that are associated with an article of sensitive information. For example, a data entry field of the format XXX-XX-XXXX may be identified as containing an article of sensitive information associated with a social security number, because the data entry field is formatted for a nine digit number in the form of a social security number. Similarly, a 16 digit data entry field may be determined to include an article of sensitive information associated with a credit card number. In some embodiments, the heuristics implemented on rule-based platform 290 may include identifying one or more phrases proximate to the identified data entry field. For example, a data entry field labeled "SSN" may be identified as containing an article of sensitive information associated with a social security number. In some embodiments, the system may identify an article of sensitive information based on the format of the one or more data entry fields.

In optional block 435, the system (e.g., screen capture device 120) may mask one or more articles of sensitive information by modifying the one or more first data entries. For example, if a social security number is identified as 356-55-9322, the system (e.g., screen capture device 120) may modify the first data entry to mask the social security number, which may be masked as \*\*\*-\*\*-\*\*\*\* and/or tokenized with a one way hash, for example transforming 356-55-9322 into 7GA-I@-3 flz.

In block 440, the system may provide a graphical user interface to the user device for a predetermined period of time. The graphical user interface may include the masked one or more articles of sensitive information that have been identified and masked by the screen capture device 120. The graphical user interface may be provided to user device 102 in order to give the user of user device 102 to provide feedback on the automatically identified and masked articles of sensitive information within the graphical user interface.

In block 445, the system may track one or more inputs received from the user device 102 using a processor. For example, once the graphical user interface is displayed to the user device 102, the user of user device 102 may provide inputs to user device 102 to indicate the position of one or more articles of sensitive information. The inputs may be indicative of articles of sensitive information that have been misidentified by screen capture device 120 for masking when they should not be masked. The inputs may also be indicative of articles of sensitive information that were not previously identified by the system yet nevertheless should be masked by the system. The inputs may be tracked by API server 122 and the inputs may be passed to other components of system 100 (e.g., screen capture device 120).

In block 450, the system may mask one or more articles of sensitive information based on the tracked inputs from the previous block. For example, if the inputs are indicative of an article of sensitive information that was not previously masked by the system, the system may now mask the identified article of sensitive information. Similarly, if an article of sensitive information was indicated by a user input to be unmasked, the system may unmask the identified data entry.

In block 455, the system may generate a second data object. The second data object may be indicative of a second graphical user interface that includes the masked one or more articles of sensitive information after the application of the additional masking based on block 345 and 350.

In block 460, the system may store the second data object in a data repository. After screen capture device masks all the identified articles of sensitive information within the graphical user interface of user device 102, the system may store the second data object associated with graphical user interface in a database (e.g., database 118 and/or database 280).

In optional block 465, the second data object may be provided to an agent terminal (e.g., agent terminal 130). The agent terminal may be operated by a human agent. User device 102 may be further assisted with the support request by a human agent operating agent terminal 130. Agent terminal 130 may be provided the second data object, which is indicative of the graphical user interface of the user device 102 that is associated with the support request. The second data object allows the graphical user interface to be viewed by the operator of agent terminal 130, including the masked one or more articles of sensitive information, which serve to protect the sensitive information of the user from unauthorized access. In addition, because an unmasked version of the graphical user interface is never stored on the system, the sensitive information cannot be inadvertently leaked even if an unauthorized user gains access to system 100.

In optional block 470, the system may transfer the chatbot support session to the agent terminal 130. For example, if the system determines that the user support session is associated with an issue that the automated system (e.g., AI terminal 124) cannot assist with, the support session may be transferred to agent terminal 130, operated by a human operator.

Figure 5:
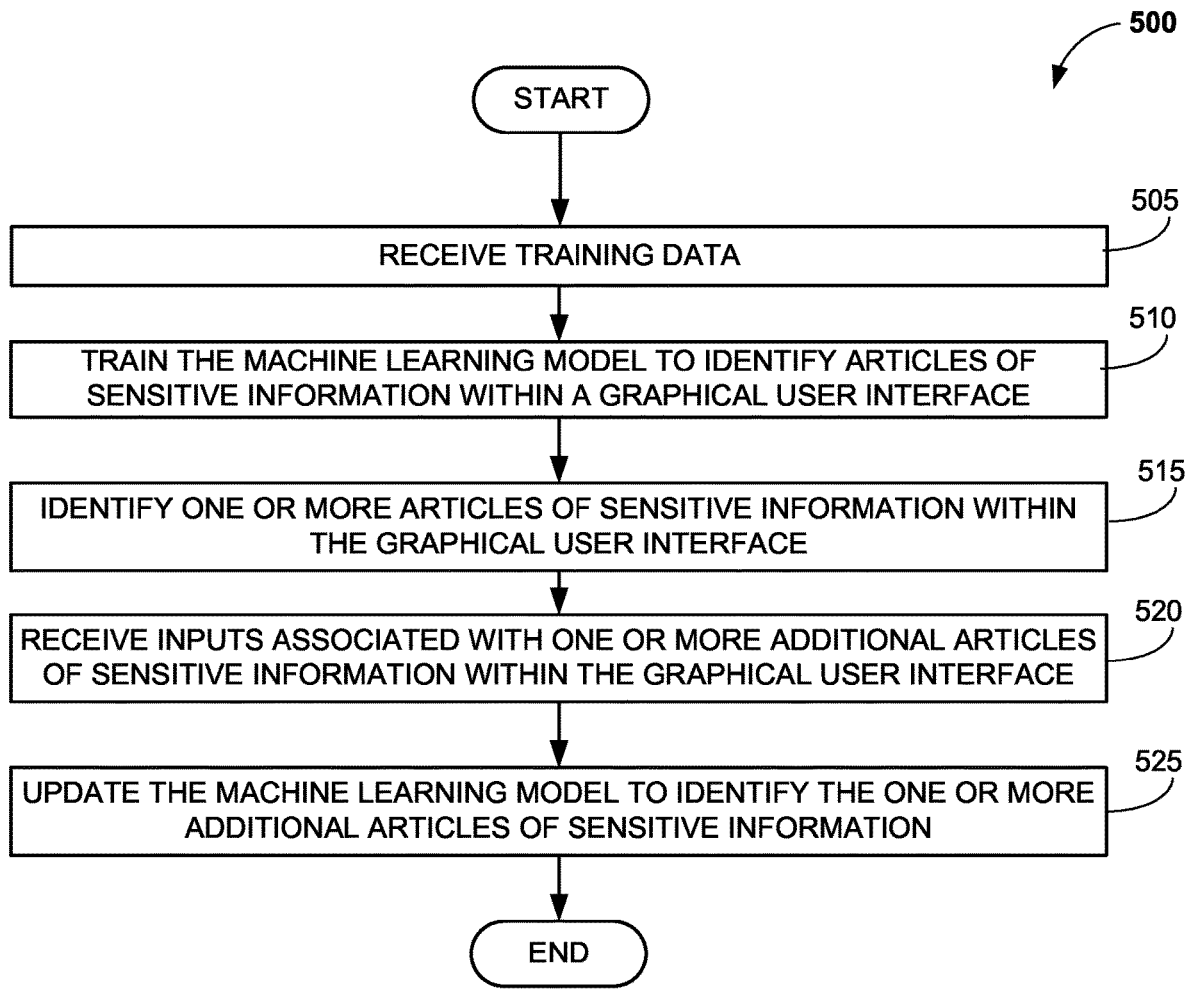
FIG. 5 is a flow diagram 500 illustrating examples of methods for training a machine learning model to identify one or more articles of sensitive information within a screen capture, according to an example implementation of the disclosed technology.

FIG. 5 is a flow diagram 500 illustrating examples of methods for training a machine learning model to identify one or more articles of sensitive information within a screen capture, according to an example implementation of the disclosed technology. As discussed with respect to FIG. 2, screen capture device 120 includes a machine learning model 295 that may be configured to identify one or more articles of sensitive information within a data object that corresponds to the graphical user interface being viewed by the user of the user device 102. The graphical user interface may be associated with a user support request which system 100 is configured to resolve based in part on receiving the masked graphical user interface from user device 102. In addition, the machine learning model 295 is configured to be intermittently updated based on feedback received from user device 102. For example, during a predetermined time period, the user device 102 may provide feedback to the system and the system may track inputs from the user device 102 to determine whether articles of sensitive of information within the graphical user interface of user device 102 have been correctly identified and masked, whether previously unidentified articles of sensitive information are present in the graphical user interface which should be masked, and whether previously masked data entries identified by machine learning model 295 are not associated with articles of sensitive information and therefore should be unmasked by screen capture device 120 prior to being saved to a database (e.g., database 118 and/or database 280).

In block 505, system 100 may receive training data. For example the system may be provided various screen captures from users of the system. According to some embodiments, the training data may additionally be annotated to identify articles of sensitive information and facilitate training of the machine learning model (e.g., machine learning model 295 implemented by screen capture device 120).

In block 510, the system (e.g., screen capture device 120) may train the machine learning model (e.g., machine learning model 295) to identify articles of sensitive information within the graphical user interface of user device 102. For example, the machine learning model 295 may be configured to learn one or more heuristics to identify potential articles of sensitive information, including identifying data entry fields typically associated with articles of sensitive information, identifying one or more phrases proximate to identified data entry fields that indicate one or more articles of sensitive information, and a format of the one or more data entry fields that indicate one or more articles of sensitive information. For example, machine learning model 295 may be trained to identify phrases that indicate a data entry containing articles of sensitive information. For example, a phrase or label proximate a data entry field that reads as "social security number," "password," "credit card number," "PAN," or the like may indicate a data entry that includes articles of sensitive information proximate the identified phrase. In another example, machine learning model 295 may be configured to identify a potential article of sensitive information based on the format of the data entry field. For example, if the data entry field has nine digits in the arrangement XXX-XX-XXXX, the machine learning model 295 may identify the data entry field as including articles of sensitive information corresponding to a social security number. Similarly, the machine learning model 295 may be configured to identify potential credit card numbers by identifying data entry fields having the requisite number of spaces (for example, 16 spaces for a 16 digit card number).

In block 515, the system (e.g., machine learning model 295 of screen capture device 120) may identify one or more articles of sensitive information within the graphical user interface. Screen capture device 120 may identify articles of sensitive information using the heuristics described with respect to block 410.

In block 520, the system (e.g., screen capture device 120) may receive inputs associated with one or more additional articles of sensitive information within the graphical user interface. This may be provided to the system by user device 102 in response to a request for user device 102 to provide the additional inputs. The additional inputs provided by user device 102 may be tracked by components of system 100 and may be used to identify additional articles of sensitive information that were not previously identified by screen capture device and/or identify data entries that were incorrectly labeled as articles of sensitive information when they are not.

In block 525, the system may update the machine learning model (e.g., machine learning model 295 of screen capture device 120) to identify one or more additional articles of sensitive information and/or to no longer identify a data entry as an article of sensitive information based on the feedback received from user device 102. Accordingly, machine learning model 295 may be continuously or intermittently updated to increase the accuracy of sensitive information identification by screen capture device 120.

Figure 6:
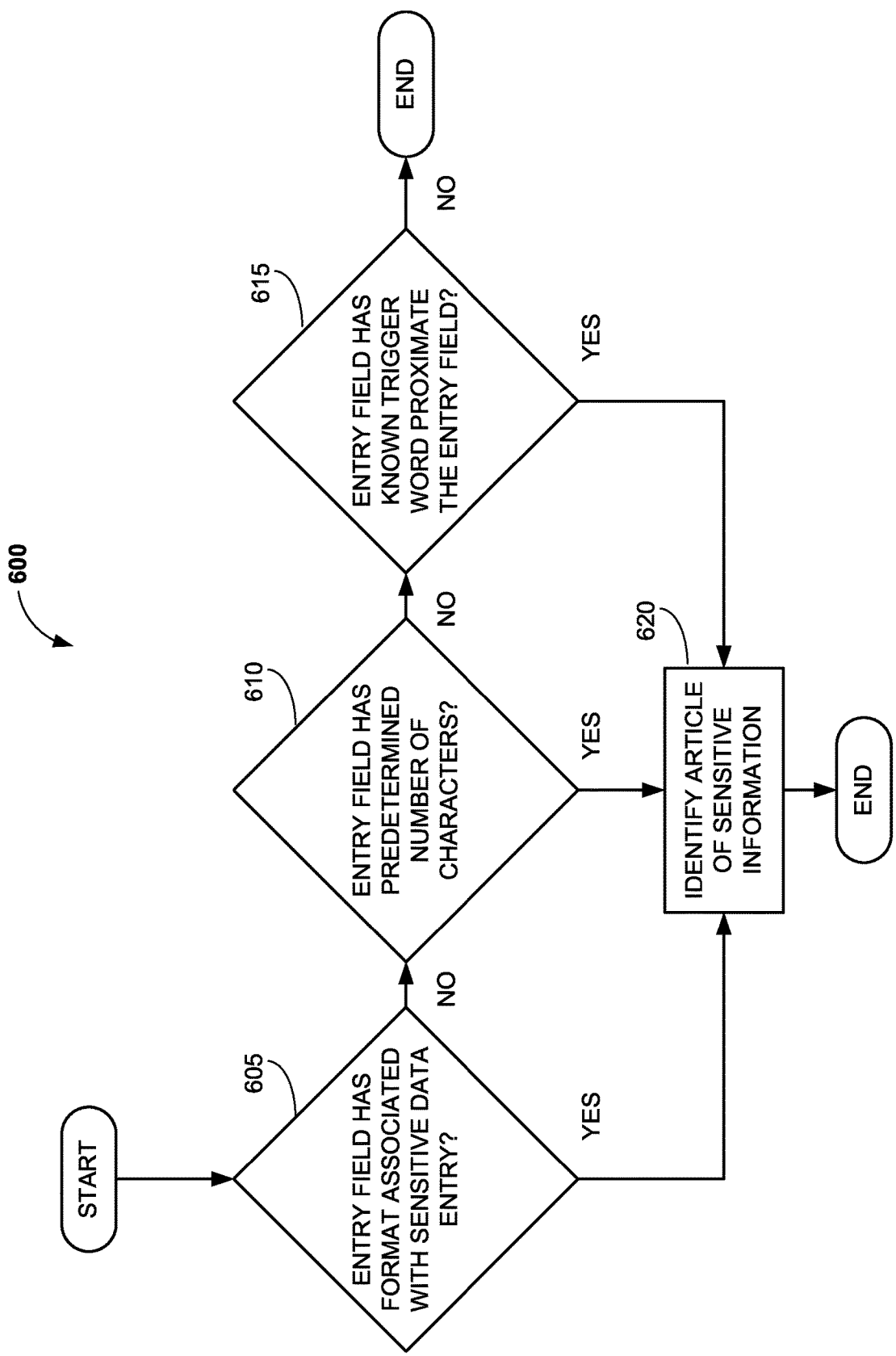
FIG. 6 is a flow diagram 600 illustrating examples of methods for identifying data entry fields associated with articles of sensitive information, according to an example implementation of the disclosed technology.

FIG. 6 is a flow diagram 500 illustrating examples of methods for identifying data entry fields associated with articles of sensitive information, according to an example implementation of the disclosed technology. In decision block 605, the system (e.g., screen capture device 120) may determine whether an entry field has a format associated with a sensitive data entry. For example, the data entry field may be analyzed to determine whether it has a format associated with a known article of sensitive information, such as a credit card number, a bank account number, a social security number, a driver's license number, a passport number, a username, a password, and the like. In response to identifying an entry field format associated with an article of sensitive information, the system may identify the article of sensitive information in block 520. If no data entry fields with a format indicative of an article of sensitive information are detected in decision block 605, the method proceeds to decision block 610.

In decision block 610, the system (e.g., screen capture device 120) may determine whether any data entry field present in the graphical user interface includes a predetermined number of characters. For example, a social security number may be associated with a 9 digit data entry field, a credit card number may be associated with a 15 or 16 digit data entry field depending on the particular credit card provider, a 10 digit data entry field can correspond to a bank account number, etc. In response to identifying a data entry field that includes the predetermined number of characters, the system may identify an article of sensitive information in block 620. If no data entry fields have the predetermined number of characters associated with an article of sensitive information in decision block 610, the method proceeds to decision block 615.

In decision block 615, the system (e.g., screen capture device 120) may determine whether a data entry field has a known trigger word proximate to the data entry field. According to some embodiments, certain words may be identified by the machine learning model 295 to identify the presence of one or more articles of sensitive information. For example, the screen capture device 120 may determine that a trigger word "password" may indicate that a data entry field proximate to the trigger word contains an article of sensitive information. In another example, "account number" may indicate the presence of an article of sensitive information in a data entry field proximate to the identified trigger word. In response to identifying a trigger word indicating the presence of an article of sensitive information, the system (e.g., screen capture device 120) may identify one or more articles of sensitive information in block 620. Otherwise, if the system does not identify a data entry field having a trigger word proximate to the data entry field in block 615, the method may end.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

A user or customer may initiate a user support session with a component of system 100, for example by accessing an application installed on user device 102 which interacts with API server 122 of system 100. The API server 122 may receive an API request to initiate a user support session. In response, API server 122 may provide instructions to AI terminal 124 to initiate the user support session with the user device 102. The AI terminal 124 may implement natural language processing methods to facilitate a dialogue between the user of user device 102 and the AI terminal 124, as the AI terminal 124 asks questions of the user to determine what the issue is that the user is having. The AI terminal 124 may determine that the issue the user is experiencing is related to an element of a graphical user interface that the user device 102 is viewing. Alternatively, the AI terminal 124 may transmit to the user device 102 a request to obtain a screen capture regardless of whether the AI terminal 124 determines that the issue the user is experiencing is related to an element of a graphical user interface that the user device 102 is viewing. In some embodiments, the user of user device 102 may indicate to the AI terminal that he or she wishes to submit a screenshot to aid in the resolution of the user issue. Accordingly, the AI terminal may instruct screen capture device 120 to capture a data object that is representative of the graphical user interface being viewed by the user device 102. The data object may be parsed by the processor of the screen capture device 120 and the screen capture device may implement one or more of the rules-based platform 290 and/or the machine learning model 295 to identify articles of sensitive information present within the graphical user interface being viewed by the user device 102. After one or more articles of sensitive information are masked by the screen capture device 120, the masked graphical user interface may be presented to the user device 102 for a predetermined period of time, giving the user of user device 102 opportunity to identify additional data entries that correspond to articles of sensitive information as well as giving the user of the user device 102 the opportunity to identify data entries that were incorrectly identified by screen capture device 120 as including articles of sensitive information. Based on the input provided by the user device 102, the screen capture device 120 may alter the data object corresponding to the graphical user interface presented to the user device 102 such that additional articles of sensitive information are masked and data entries incorrectly identified as sensitive are unmasked. Following the predetermined time period, the modified data object is saved to a database (e.g., database 118) by screen capture device 120. The user support session between the AI terminal and the user device 102 may be transferred to an Agent terminal 130 to further assist the user (e.g., by providing agent terminal 130 access to the database 118 on which the modified data object is stored), and Agent terminal 130 may access the stored data object, which facilitates agent operating Agent terminal 130 to have a comprehensive view of the graphical user interface associated with the user's user support session. Agent terminal 130 and the user device 102 may continue to interact until the user issue is resolved based in part on the helpful context provided by the graphical user interface captured by the system 100.

Examples of the present disclosure can be implemented according to at least the following clauses:

Clause 1: A system for linking a screen capture to a user support session, the system comprising: one or more processors; and a non-transitory memory in communication with the one or more processors and storing instructions that, when executed by the one or more processors are configured to cause the system to: receive, by an API implemented by the one or more processors, a screen capture initiation request from a user device; capture, by the API, a first data object indicative of a first graphical user interface associated with the user device; provide, to the user device, the first graphical user interface for a predetermined period of time, the first graphical user interface comprising a request for a user of the user device to identify one or more first articles of sensitive information within the first graphical user interface; track, by the one or more processors via the API, one or more inputs received from the user device indicating a position of the one or more first articles of sensitive information within the first graphical user interface over the predetermined period of time; mask, by the API, the one or more first articles of sensitive information within the first graphical user interface; automatically generate a second data object indicative of a second graphical user interface, the second graphical user interface comprising the masked one or more first articles of sensitive information; and store, by the API, the second data object in a data repository.

Clause 2: The system of clause 1, wherein the instructions, when executed by the one or more processors are configured to cause the system to: receive metadata from the user device, the metadata associated with the screen capture initiation request; receive, from an agent terminal, a request for the second data object; provide the second data object to the agent terminal, thereby facilitating display of the second graphical user interface on the agent terminal.

Clause 3: The system of clause 2, wherein the metadata comprises a user identifier, a user session identifier, and a timestamp associated with the screen capture initiation request.

Clause 4: The system of clause 1, wherein the instructions, when executed by the one or more processors are configured to cause the system to: identify, by the API, one or more second data entries within the first data object indicative of one or more second articles of sensitive information displayed by the first graphical user interface; mask, by the API, the one or second articles of sensitive information within the first graphical user interface by modifying the one or more second data entries; wherein the second graphical user interface further comprises the masked one or more second articles of sensitive information.

Clause 5: The system of clause 4, wherein identifying the one or more second articles of sensitive information displayed by the first graphical user interface further comprises implementing a trained machine learning model to identify the one or more second articles of sensitive information.

Clause 6: The system of clause 5, wherein the trained machine learning model is configured to identify articles of sensitive information based on or more heuristics comprising identifying data entry fields associated with one or more articles of sensitive information, identifying one or more phrases proximate to the identified data entry fields indicative of one or more articles of sensitive information, a format of one or more data entry fields indicative of one or more articles of sensitive information, and combinations thereof.

Clause 7: The system of clause 6, wherein the tracked one or more inputs further comprise: an indication of one or more second articles of sensitive information identified by the trained machine learning model that should be unmasked prior to the second data object being stored in the data repository or a data entry field associated with the user support session; wherein an indication of the one or more first articles of sensitive information received from the user device are used to update the trained machine learning model to automatically identify the one or more first articles of sensitive information.

Clause 8: The system of clause 1, wherein the one or more first articles of sensitive information comprise sensitive information selected from a password, a social security number, an account number, a credit card number, and combinations thereof.

Clause 9: The system of clause 1, wherein the screen capture initiation request is received by the API in response to a chatbot user support session initiated by the user of the user device.

Clause 10: A system for linking a screen capture to a user support session, the system comprising: one or more processors; and a non-transitory memory in communication with the one or more processors and storing instructions that, when executed by the one or more processors are configured to cause the system to: receive, from a user device, a support request comprising a user identifier; initiate a chatbot support session with the user device; transmit, by an API implemented by the one or more processors, a screen capture initiation request to the user device; receive, by the API, an approval of the screen capture initiation request; capture, by the API, a first data object indicative of a first graphical user interface associated with the user device; identify, by the API, one or more first data entries within the first data object indicative of one or more first articles of sensitive information displayed by the first graphical user interface; mask, by the API, the one or more first articles of sensitive information within the first graphical user interface by modifying the one or more first data entries; provide, to the user device, a modified graphical user interface for a predetermined period of time, the modified graphical user interface comprising the masked one or more first articles of sensitive information and a request for a user of the user device to identify one or more second articles of sensitive information within the modified graphical user interface; track, by the one or more processors via the API, one or more inputs received from the user device indicating a position of the one or more second articles of sensitive information within the modified graphical user interface over the predetermined period of time; mask, by the API, the one or more second articles of sensitive information within the modified graphical user interface; automatically generate a second data object indicative of a second graphical user interface, the second graphical user interface comprising the masked one or more first articles of sensitive information and masked one or more second articles of sensitive information; store, by the API, the second data object and the user identifier associated with the support request in a data repository; provide, the second data object and the user identifier to an agent terminal; and transfer the chatbot support session to the agent terminal.

Clause 11: The system of clause 10, wherein identifying the one or more first articles of sensitive information displayed by the first graphical user interface further comprises implementing a trained machine learning model to identify the one or more first articles of sensitive information.

Clause 12: The system of clause 11, wherein the trained machine learning model is configured to identify articles of sensitive information based on or more heuristics comprising identifying data entry fields associated with one or more articles of sensitive information, identifying one or more phrases proximate to the identified data entry fields indicative of one or more articles of sensitive information, a format of one or more data entry fields indicative of one or more articles of sensitive information, and combinations thereof.

Clause 13: The system of clause 12, wherein the tracked one or more inputs received from the user device are used to update the trained machine learning model to automatically identify the one or more second articles of sensitive information.

Clause 14: The system of clause 10, wherein the one or more first articles of sensitive information and the one or more second articles of sensitive information comprise sensitive information selected from a password, a social security number, an account number, a credit card number, and combinations thereof.

Clause 15: The system of clause 10, wherein the one or more inputs received from the user device further indicate a data entry field associated with the support request.

Clause 16: A computer-implemented method for linking a screen capture to a user support session, the method comprising: receiving, from a user device, a support request comprising a user identifier; initiating a chatbot support session with the user device; transmitting, by an API implemented by one or more processors, a screen capture initiation request to the user device; receiving, by the API, an approval of the screen capture initiation request; capturing, by the API, a first data object indicative of a first graphical user interface associated with the user device; identifying, by the API, one or more first data entries within the first data object indicative of one or more first articles of sensitive information displayed by the first graphical user interface; masking, by the API, the one or more first articles of sensitive information within the first graphical user interface by modifying the one or more first data entries; providing, to the user device, a modified graphical user interface for a predetermined period of time, the modified graphical user interface comprising the masked one or more first articles of sensitive information and a request for a user of the user device to identify one or more second articles of sensitive information within the modified graphical user interface; tracking, by the one or more processors via the API, one or more inputs received from the user device indicating a position of the one or more second articles of sensitive information within the modified graphical user interface over the predetermined period of time; masking, by the API, the one or more second articles of sensitive information within the modified graphical user interface; automatically generating a second data object indicative of a second graphical user interface, the second graphical user interface comprising the masked one or more first articles of sensitive information and masked one or more second articles of sensitive information; storing, by the API, the second data object in a data repository; providing, the second data object to an agent terminal; and transferring the chatbot support session to the agent terminal.

Clause 17: The method of clause 16, wherein identifying the one or more first articles of sensitive information displayed by the first graphical user interface further comprises implementing a trained machine learning model to identify the one or more first articles of sensitive information.

Clause 18: The method of clause 17, wherein the trained machine learning model is configured to identify articles of sensitive information based on or more heuristics comprising identifying data entry fields associated with one or more articles of sensitive information, identifying one or more phrases proximate to the identified data entry fields indicative of one or more articles of sensitive information, a format of one or more data entry fields indicative of one or more articles of sensitive information, and combinations thereof.

Clause 19: The method of clause 18, wherein the tracked one or more inputs received from the user device are used to update the trained machine learning model to automatically identify the one or more second articles of sensitive information.

Clause 20: The method of claim 16, wherein the one or more inputs received from the user device further indicate a data entry field associated with the support request.

The invention claimed is:

1. A system for linking a screen capture to a user support session, the system comprising:
one or more processors; and
a non-transitory memory in communication with the one or more processors and storing instructions that, when executed by the one or more processors are configured to cause the system to:
receive, by an API implemented by the one or more processors, a screen capture initiation request from a user device;
capture, by the API, a first data object indicative of a first graphical user interface associated with the user device;
provide, to the user device, the first graphical user interface for a predetermined period of time, the first graphical user interface comprising a request for a user of the user device to identify one or more first articles of sensitive information within the first graphical user interface;
track, by the one or more processors via the API, one or more inputs received from the user device indicating a position of the one or more first articles of sensitive information within the first graphical user interface over the predetermined period of time;
mask, by the API, the one or more first articles of sensitive information within the first graphical user interface;
identify, by the API, one or more second data entries within the first data object indicative of one or more second articles of sensitive information displayed by the first graphical user interface;
mask, by the API, the one or second articles of sensitive information within the first graphical user interface by modifying the one or more second data entries;
automatically generate a second data object indicative of a second graphical user interface, the second graphical user interface comprising the masked one or more first articles of sensitive information and the masked one or more second articles of sensitive information; and
store, by the API, the second data object in a data repository.

2. The system of claim 1, wherein the instructions, when executed by the one or more processors are configured to cause the system to:
receive metadata from the user device, the metadata associated with the screen capture initiation request;
receive, from an agent terminal, a request for the second data object;
provide the second data object to the agent terminal, thereby facilitating display of the second graphical user interface on the agent terminal.

3. The system of claim 2, wherein the metadata comprises a user identifier, a user session identifier, and a timestamp associated with the screen capture initiation request.

4. The system of claim 1, wherein identifying the one or more second articles of sensitive information displayed by the first graphical user interface further comprises implementing a trained machine learning model to identify the one or more second articles of sensitive information.

5. The system of claim 4, wherein the trained machine learning model is configured to identify articles of sensitive information based on or more heuristics comprising identifying data entry fields associated with one or more articles of sensitive information, identifying one or more phrases proximate to the identified data entry fields indicative of one or more articles of sensitive information, a format of one or more data entry fields indicative of one or more articles of sensitive information, and combinations thereof.

6. The system of claim 5, wherein the tracked one or more inputs further comprise:
an indication of one or more second articles of sensitive information identified by the trained machine learning model that should be unmasked prior to the second data object being stored in the data repository or a data entry field associated with the user support session;
wherein an indication of the one or more first articles of sensitive information received from the user device are used to update the trained machine learning model to automatically identify the one or more first articles of sensitive information.

7. The system of claim 1, wherein the one or more first articles of sensitive information comprise sensitive information selected from a password, a social security number, an account number, a credit card number, and combinations thereof.

8. The system of claim 1, wherein the screen capture initiation request is received by the API in response to a chatbot user support session initiated by the user of the user device.

9. A system for linking a screen capture to a user support session, the system comprising:
one or more processors; and
a non-transitory memory in communication with the one or more processors and storing instructions that, when executed by the one or more processors are configured to cause the system to:
receive, from a user device, a support request comprising a user identifier;
initiate a chatbot support session with the user device;
transmit, by an API implemented by the one or more processors, a screen capture initiation request to the user device;
receive, by the API, an approval of the screen capture initiation request;
capture, by the API, a first data object indicative of a first graphical user interface associated with the user device;
identify, by the API, one or more first data entries within the first data object indicative of one or more first articles of sensitive information displayed by the first graphical user interface;
mask, by the API, the one or more first articles of sensitive information within the first graphical user interface by modifying the one or more first data entries;
provide, to the user device, a modified graphical user interface for a predetermined period of time, the modified graphical user interface comprising the masked one or more first articles of sensitive information and a request for a user of the user device to identify one or more second articles of sensitive information within the modified graphical user interface;
track, by the one or more processors via the API, one or more inputs received from the user device indicating a position of the one or more second articles of sensitive information within the modified graphical user interface over the predetermined period of time;
mask, by the API, the one or more second articles of sensitive information within the modified graphical user interface;
automatically generate a second data object indicative of a second graphical user interface, the second graphical user interface comprising the masked one or more first articles of sensitive information and masked one or more second articles of sensitive information;
store, by the API, the second data object and the user identifier associated with the support request in a data repository;
provide, the second data object and the user identifier to an agent terminal; and
transfer the chatbot support session to the agent terminal.

10. The system of claim 9, wherein identifying the one or more first articles of sensitive information displayed by the first graphical user interface further comprises implementing a trained machine learning model to identify the one or more first articles of sensitive information.

11. The system of claim 10, wherein the trained machine learning model is configured to identify articles of sensitive information based on or more heuristics comprising identifying data entry fields associated with one or more articles of sensitive information, identifying one or more phrases proximate to the identified data entry fields indicative of one or more articles of sensitive information, a format of one or more data entry fields indicative of one or more articles of sensitive information, and combinations thereof.

12. The system of claim 11, wherein the tracked one or more inputs received from the user device are used to update the trained machine learning model to automatically identify the one or more second articles of sensitive information.

13. The system of claim 9, wherein the one or more first articles of sensitive information and the one or more second articles of sensitive information comprise sensitive information selected from a password, a social security number, an account number, a credit card number, and combinations thereof.

14. The system of claim 9, wherein the one or more inputs received from the user device further indicate a data entry field associated with the support request.

15. A computer-implemented method for linking a screen capture to a user support session, the method comprising:
receiving, from a user device, a support request comprising a user identifier;
initiating a chatbot support session with the user device;
transmitting, by an API implemented by one or more processors, a screen capture initiation request to the user device;
receiving, by the API, an approval of the screen capture initiation request;
capturing, by the API, a first data object indicative of a first graphical user interface associated with the user device;
identifying, by the API, one or more first data entries within the first data object indicative of one or more first articles of sensitive information displayed by the first graphical user interface;
masking, by the API, the one or more first articles of sensitive information within the first graphical user interface by modifying the one or more first data entries;
providing, to the user device, a modified graphical user interface for a predetermined period of time, the modified graphical user interface comprising the masked one or more first articles of sensitive information and a request for a user of the user device to identify one or more second articles of sensitive information within the modified graphical user interface;
tracking, by the one or more processors via the API, one or more inputs received from the user device indicating a position of the one or more second articles of sensitive information within the modified graphical user interface over the predetermined period of time;
masking, by the API, the one or more second articles of sensitive information within the modified graphical user interface;
automatically generating a second data object indicative of a second graphical user interface, the second graphical user interface comprising the masked one or more first articles of sensitive information and masked one or more second articles of sensitive information;
storing, by the API, the second data object in a data repository;

providing, the second data object to an agent terminal; and transferring the chatbot support session to the agent terminal.

16. The method of claim 15, wherein identifying the one or more first articles of sensitive information displayed by the first graphical user interface further comprises implementing a trained machine learning model to identify the one or more first articles of sensitive information.

17. The method of claim 16, wherein the trained machine learning model is configured to identify articles of sensitive information based on or more heuristics comprising identifying data entry fields associated with one or more articles of sensitive information, identifying one or more phrases proximate to the identified data entry fields indicative of one or more articles of sensitive information, a format of one or more data entry fields indicative of one or more articles of sensitive information, and combinations thereof.

18. The method of claim 17, wherein the tracked one or more inputs received from the user device are used to update the trained machine learning model to automatically identify the one or more second articles of sensitive information.

19. The method of claim 15, wherein the one or more inputs received from the user device further indicate a data entry field associated with the support request.

\* \* \* \* \*